(12) United States Patent
Fumey et al.

(10) Patent No.: US 10,571,295 B2
(45) Date of Patent: Feb. 25, 2020

(54) METHOD AND DEVICE FOR MONITORING AN AVIONICS SOFTWARE APPLICATION VIA ITS EXECUTION DURATION, RELATED COMPUTER PROGRAM AND AVIONICS SYSTEM

(71) Applicant: THALES, Courbevoie (FR)

(72) Inventors: Marc Fumey, Merignac (FR); Joël Henri René Bosson, Merignac (FR); Tarik Aegerter, Merignac (FR); Yves Meyer, Merignac (FR); Hubert Lacquit, Merignac (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 16/154,535

(22) Filed: Oct. 8, 2018

(65) Prior Publication Data

US 2019/0107415 A1     Apr. 11, 2019

(30) Foreign Application Priority Data

Oct. 11, 2017   (FR) ...................... 17 01055

(51) Int. Cl.
*G01C 23/00*      (2006.01)
*G01C 25/00*      (2006.01)
(Continued)

(52) U.S. Cl.
CPC ........... *G01C 23/005* (2013.01); *G01C 25/00* (2013.01); *G06F 11/0724* (2013.01);
(Continued)

(58) Field of Classification Search
None
See application file for complete search history.

(56) References Cited

U.S. PATENT DOCUMENTS

| 2003/0037172 A1 | 2/2003 | Lacombe et al. |
| 2017/0083394 A1* | 3/2017 | Pont ...................... G06F 9/4887 |
| 2017/0102968 A1* | 4/2017 | Pont ...................... G06F 9/4887 |

FOREIGN PATENT DOCUMENTS

| EP | 2 133 793 | 12/2009 |
| WO | WO 2015/173532 | 11/2015 |
| WO | WO 2017/024371 | 2/2017 |

OTHER PUBLICATIONS

Preliminary Search Report dated Jul. 4, 2018, received in FR 1701055 filed Oct. 11, 2017.

* cited by examiner

*Primary Examiner* — Thomas S McCormack
(74) *Attorney, Agent, or Firm* — Knobbe, Martens, Olson & Bear, LLP

(57) ABSTRACT

A method and device for monitoring an avionics software application via its execution duration, related computer program and avionics system are disclosed. In one aspect, the method, executed on a platform hosting an operating system, is implemented by an electronic monitoring device. The avionics software application includes one or several software processing operations to be executed, the platform is configured to be on board an aircraft. The method includes: monitoring the execution duration of the avionics software application, through the verification, upon expiration of at least one predefined execution times, of the completion of the execution of at least one software processing operation of the avionics software application; and updating a status of the avionics software application based on the monitoring of the execution duration of the avionics software application.

12 Claims, 2 Drawing Sheets

(51) Int. Cl.
*G06F 11/36* (2006.01)
*G06F 11/07* (2006.01)
*G06F 11/30* (2006.01)
*G06F 11/34* (2006.01)

(52) U.S. Cl.
CPC ...... *G06F 11/0739* (2013.01); *G06F 11/0757* (2013.01); *G06F 11/3013* (2013.01); *G06F 11/3419* (2013.01); *G06F 11/3612* (2013.01)

METHOD AND DEVICE FOR MONITORING AN AVIONICS SOFTWARE APPLICATION VIA ITS EXECUTION DURATION, RELATED COMPUTER PROGRAM AND AVIONICS SYSTEM

CROSS-REFERENCE TO RELATED APPLICATIONS

This patent application claims the benefit under 35 U.S.C. § 119 of French Application No. FR 17 01055 filed on Oct. 11, 2017 which is hereby incorporated by reference in its entirety.

BACKGROUND

Technological Field

The described technology relates to a method for monitoring an avionics software application, able to be executed on a platform hosting an operating system, the avionics software application comprising one or several software processing operations to be executed, the platform being intended to be on board an aircraft, the method being implemented by an electronic monitoring device.

The described technology also relates to a non-transitory computer-readable medium including a computer program including software instructions which, when executed by a computer, implement such a method.

The described technology also relates to electronic device for monitoring an avionics software application, able to be executed on a platform hosting an operating system, the avionics software application comprising one or several software processing operations to be executed, the platform being intended to be on board an aircraft.

The described technology also relates to an electronic avionics system comprising a memory able to store at least one avionics software application; a platform able to execute each avionics software application, the platform hosting an operating system; and such an electronic monitoring device for each avionics software application.

The described technology relates to the qualification of on-board avionics platforms, in particular the monitoring of the operation of software applications executed on such on-board avionics platforms, in particular for avionics platforms comprising one or several multicore processors. The monitoring is for example monitoring of the Safety Net type.

Description of the Related Technology

Using multicore processors creates substantial difficulty for the qualification of the platforms. Indeed, running several software applications at the same time on one processor creates risks of contention due to the sharing of common resources (bus, memory), the behavior of the processor, in particular when it is a multicore processor, not being able to be controlled easily.

The term "contention" refers to any situation in which at least one activity carried out by at least one core of a multicore processor experiences delays in its performance due to the temporal parallelism allowed by said multicore processor.

The origin of the contentions is generally the use of shared resources of the processor or the operating system, also called OS, resulting in waits causing these delays. A contention then causes a delay in the execution of a software application hosted in a core.

A first example of contention is the bus (often called "interconnect") connecting the cores to one another, which does not always allow simultaneous transactions between cores or between the cores and the peripherals, such as certain integrated cache memories or the external memory.

Another example of contention is the use of common software modules of the OS installed on one of the cores and called by all of the cores, potentially at the same time. Simultaneous calls for such shared software modules lead to arbitration and the placement of some requests in standby in order to serialize the software processing operations on the core where the shared software module is installed.

Another example of contention is a temporary interruption of all of the cores on a particular event on one of the cores in order to manage a coherent status among all of the cores.

When the processor is further a processor purchased from a supplier, or a COTS (Commercial Off-The-Shelf) processor, it is generally impossible to access the design details of the internal members of such a multicore processor, and it is therefore very difficult, if not impossible, to guarantee a deterministic behavior of the processor.

SUMMARY OF CERTAIN INVENTIVE ASPECTS

One inventive aspect includes a method and device for monitoring an avionics software application able to be executed on an avionics platform, which allows more effective monitoring of the software application.

Another aspect relates to a method for monitoring an avionics software application, able to be executed on a platform hosting an operating system, the avionics software application comprising one or several software processing operations to be executed, the platform being intended to be on board an aircraft, the method being implemented by an electronic monitoring device.

monitoring the execution duration of the avionics software application, through the verification, upon expiration of at least one predefined execution times, of the completion of the execution of at least one software processing operation of the avionics software application; and updating a status of the avionics software application based on the monitoring of the execution duration of the avionics software application.

With the monitoring method according to the described technology, the monitoring of the execution duration of the avionics software application then makes it possible to detect a malfunction of the avionics software application, corresponding to a contention situation of the avionics software application, or to a "nonsecure" situation involving an operating security risk.

According to other advantageous aspects of the described technology, the monitoring method comprises one or more of the following features, considered alone or according to all technically possible combinations:

the step for monitoring the execution duration comprises verifying, upon expiration of a first predefined execution time, then upon expiration of a second predefined execution time, the completion of the execution of at least one software processing operation of the avionics software application, the second predefined execution time being strictly greater than the first predefined execution time;

during the step for updating the status, the status of the avionics software application is set at "contention" when the completion of the execution of the corresponding software processing operation(s) of the avionics software application has been detected after the expiration of the first predefined execution time and before the expiration of the second predefined execution time;

during the step for updating the status:

the status of the avionics software application is set at "normal" when the completion of the execution of the corresponding software processing operation(s) of the avionics software application has been detected before the expiration of the or each predefined execution time; and the status of the avionics software application is set at "nonsecure" when the completion of the execution of the corresponding software processing operation(s) of the avionics software application has not been detected after the expiration of the or each predefined execution time;

the method further comprises the following step:

monitoring the behavior of the avionics software application, through the verification, upon expiration of a predefined monitoring period, of the detection of at least one application event of the avionics software application;

the update of the status of the avionics software application then depending on the monitoring of the execution duration and the monitoring of the behavior of the avionics software application;

during the step for updating the status, the status of the avionics software application is set at "contention" when the completion of the execution of the corresponding software processing operation(s) of the avionics software application has been detected after the expiration of the first predefined execution time and before the expiration of the second predefined execution time, and when the correct application event(s) have been detected before the expiration of the predefined monitoring period;

during the step for updating the status:

the status of the avionics software application is set at "normal" when the completion of the execution of the corresponding software processing operation(s) of the avionics software application has been detected before the expiration of the or each predefined execution time and when the correct application event(s) have been detected before the expiration of the predefined monitoring period; and the status of the avionics software application is set at "nonsecure" when the completion of the execution of the corresponding software processing operation(s) of the avionics software application has not been detected after the expiration of the or each predefined execution time and when the correct application event(s) have been detected before the expiration of the predefined monitoring period;

during the step for updating the status, the status of the avionics software application is set at "beyond control" when no application event has been detected upon expiration of the predefined monitoring period or when the detected application event is incorrect; and when the completion of the execution of the corresponding software processing operation(s) of the avionics software application has not been detected after the expiration of the or each predefined execution time, and when no application event has been detected upon expiration of the predefined monitoring period or the detected application event is incorrect, the status of the avionics software application is, during the step for updating the status, set at "nonsecure" if each predefined execution time is shorter than the predefined monitoring period and "beyond control" if not.

With the monitoring method according to a second embodiment of the described technology, the monitoring of both the execution duration of the avionics software application and the behavior of the avionics software application then makes it possible to detect a malfunction of the avionics software application, corresponding to a contention situation of the avionics software application, to a "nonsecure" situation involving an operating security risk, or to a "beyond control" situation where the avionics software application is considered to have become wild.

The described technology also relates to a non-transitory computer-readable medium including a computer program including software instructions which, when executed by a computer, implement a monitoring method as defined above.

The described technology also relates to electronic device for monitoring an avionics software application, able to be executed on a platform hosting an operating system, the avionics software application comprising one or several software processing operations to be executed, the platform being intended to be on board an aircraft, the electronic monitoring device including:

a monitoring module configured to monitor the execution duration of the avionics software application, through the verification, upon expiration of at least one predefined execution time, of the completion of the execution of at least one software processing operation of the avionics software application; and an update module configured to update a status of the avionics software application based on the monitoring of the execution duration of the avionics software application.

The described technology also relates to an electronic avionics system comprising:

a memory able to store at least one avionics software application;

a platform able to execute each avionics software application, the platform hosting an operating system; and an electronic monitoring device for each avionics software application, the electronic monitoring device being as defined above.

BRIEF DESCRIPTION OF THE DRAWINGS

These features and advantages of the described technology will appear more clearly upon reading the following description, provided solely as a non-limiting example, and done in reference to the appended drawings, in which.

DETAILED DESCRIPTION OF CERTAIN INVENTIVE EMBODIMENTS

Figure 1:
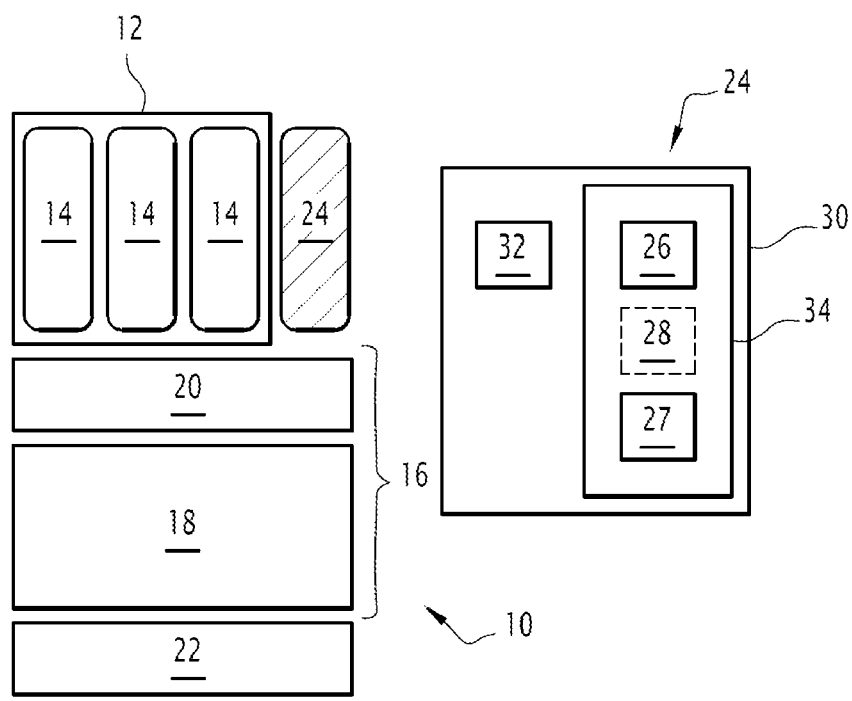
FIG. 1 is a schematic illustration of an electronic avionics system according to the described technology, comprising a memory able to store at least one avionics software application; a platform able to execute each avionics software application, the platform including resources and hosting an operating system; and an electronic monitoring device for an avionics software application.

In FIG. 1, an electronic avionics system 10, intended to be placed on board an aircraft, comprises a memory 12 able to store at least one avionics software application 14; a platform 16 able to execute each avionics software application 14, the platform 16 including resources 18 and hosting an operating system 20, the platform 16 being connected to other electronic avionics systems 22 of the aircraft.

The electronic avionics system 10 further comprises, according to the described technology, an electronic device 24 for monitoring an avionics software application 14.

In FIG. 1, to simplify the drawing, the memory 12 has been shown outside the rectangle symbolizing the resources 18, in order to provide a distinct illustration of the software layer corresponding to the software applications 14, as well as the monitoring device 24, if applicable. Nevertheless, one skilled in the art will of course understand that the memory 12 is included in the resources 18 of the platform 16.

The aircraft is preferably an airplane. Alternatively, the aircraft is a helicopter, or a drone piloted remotely by a pilot.

In the example of FIG. 1, the memory 12 is able to store three separate avionics software applications 14, and the electronic monitoring device 24 is then configured to monitor at least one avionics software application 14, and preferably each of these avionics software applications 14.

Each avionics software application 14 is intended to be executed by the platform 16 and then designed to emit one or several calls to the operating system 20 hosted by the platform 16 and is also configured to use resources 18 of the platform 16. Each avionics software application 14 comprises one or several software processing operations to be carried out.

Each avionics software application 14 is also called avionics function. The avionics software applications 14 perform different functions to carry out a flight, and are for example installed on different platforms 16 and use the resources 18 of said platforms 16.

Each avionics software application 14 carries out software processing operations. A software processing operation refers to a set of operations on data of the avionics software application 14 making it possible to perform parts of an avionics function, such as an acquisition or a transmission of data, mathematical calculations, logic processing operations, a data manipulation.

Each software processing operation is also called process, or software process. A software processing operation is for example a process within the meaning of standard ARINC 653.

Such functions being critical, like for example the braking system or the flight management system, each avionics software application 14 is preferably monitored regularly by the electronic monitoring device 24, during substantially the entire performance duration of the avionics software application 14 by the platform 16.

The platform 16 is intended to be on board the aircraft. The platform 16 is for example an information processing unit made up of one or several memories associated with one or several processors.

The resources 18 of the platform 16 are physical or logic elements capable of being provided to the avionics software application(s) 14.

The resources 18 are for example broken down into the following categories: data processing resources, such as one or several processors; memory resources; input and output resources; resources specific to the avionics network, such as communication routers of an ARINC664 network; graphic resources, i.e., allowing data to be displayed; and mass memory resources.

The operating system 20 is for example an operating system according to the ARINC 653 standard, or a POSIX operating system, or a hypervisor, or middleware. One skilled in the art will then understand that the operating system 20 is to be understood broadly, and is more generally a set of at least one system software program, designed to offer services of different types to each application 14.

The electronic monitoring device 24 is configured to monitor at least one avionics software application 14 capable of being executed on the platform 16, and comprises a first monitoring module 26 configured to monitor the execution duration, also called execution time, of the avionics software application 14.

The electronic monitoring device 24 comprises an update module 27 configured to update a status of the avionics software application 14 based on the monitoring of the execution duration of the avionics software application 14.

As an optional addition, according to a second embodiment of the described technology, the electronic monitoring device 24 further comprises a second monitoring module 28 configured to monitor the behavior of the avionics software application 14, through the verification, upon expiration of a predefined monitoring period Tf, of the detection of at least one application event of the avionics software application. The update of the status of the avionics software application by the update module 27 then depends on the monitoring of the execution duration and the monitoring of the behavior of the avionics software application.

In the example of FIG. 1, the electronic monitoring device 24 is for example separate from the platform 16, and comprises an information processing unit 30 for example made up of a processor 32 associated with a memory 34.

In an alternative, for which the monitoring device 24 is shown in horizontal crosshatching in FIG. 1, the monitoring device 24 is able to be executed directly by the platform 16 and then to use its resources 18. This alternative is a preferred embodiment, and the monitoring device 24 is then preferably further hosted in the operating system 20 or within a specific memory partition of the platform 16, this specific partition in turn being protected from cyber attacks, for example via one or several access controls and/or integrity protection.

In the example of FIG. 1, whether the monitoring device 24 is separate from the platform 16 or hosted and executed by the platform 16, the first monitoring module 26 and the update module 27, as well as, as an optional addition, the second monitoring module 28, are each made in the form of software, or a software package, executable by a processor, such as the processor 32 when the monitoring device 24 is separate from the platform 16. The memory 34 of the monitoring device 24 is then able to store a first monitoring software application suitable for monitoring the execution duration of the avionics software application 14 and an update software application suitable for updating the status of the avionics software application 14 based on the monitoring of the execution duration of the avionics software application 14. As an optional addition, the memory 34 of the monitoring device 24 is also able to store a second monitoring software application suitable for monitoring the behavior of the avionics software application 14, the update of the status then depending on the monitoring of the execution duration and the monitoring of the behavior of the avionics software application. The processor is then able to execute the first monitoring software application and the update software application, as well as, as an optional addition, the second monitoring software application.

In an alternative that is not shown, the first monitoring module 26 and the update module 27 as well as, optionally and additionally, the second monitoring module 28, are each made in the form of a programmable logic component, such as an FPGA (Field Programmable Gate Array), or in the form of a dedicated integrated circuit, such as an ASIC (Applications Specific Integrated Circuit).

When the monitoring device 24 is made in the form of one or several software programs, i.e., in the form of a computer program, it is further able to be stored on a medium, not shown, readable by computer. The computer-readable medium is for example a medium suitable for storing electronic instructions and able to be coupled with a bus of a computer system. As an example, the readable medium is a floppy disk, an optical disc, a CD-ROM, a magnetic-optical disc, a ROM memory, a RAM memory, any type of non-volatile memory (for example, EPROM, EEPROM, FLASH, NVRAM), a magnetic card or an optical card. A computer program including software instructions is then stored on the readable medium.

The first monitoring module 26 is configured to monitor the execution duration of the avionics software application 14, through the verification, upon expiration of at least one predefined execution time T1, T2, of the completion of the execution of at least one software processing operation of the avionics software application 14.

The first monitoring module 26 is preferably configured to monitor the execution duration of the avionics software application 14 in light of two separate predefined execution times, i.e., a first predefined execution time T1 and a second predefined execution time T2, greater than the first execution time T1. The first monitoring module 26 is configured to monitor the execution duration of the avionics software application 14, through the verification, upon expiration of the predefined execution time T1, then upon expiration of the second predefined execution time T2, of the completion of the execution of at least one software processing operation of the avionics software application 14.

The monitoring of the execution duration of the avionics software application 14 is a monitoring of the avionics software application 14 as a whole or of one or several software processing operations of said avionics software application 14, such as processes according to the ARINC 653 standard. In the case of monitoring of the execution duration of the avionics software application 14 as a whole, the first predefined execution time T1 is for example deduced directly from the WCET (Worst Case Execution Time) established during a qualification of the avionics software application 14. In the case of monitoring of the execution duration of one or several software processing operations of the avionics software application 14, the first predefined execution time T1 is established as a function of worst-case execution times of said software processing operation(s), taking into account any execution duration totals.

The knowledge of said first predefined execution time T1 by the monitoring device 24 is achieved either by configuration associated with the avionics software application 14, or upon initializing the avionics software application 14.

In the example of a platform 16 according to standard ARINC 653, the execution duration of each process of the avionics software application 14 can be monitored, and a first execution time T1 is then predefined for each process. The first execution time T1 then corresponds to the duration from which said process must be completed from the perspective of the maximum execution time.

The detection of the completion of the execution of each software processing operation of the avionics software application 14 is for example done directly via a deadline mechanism offered for the processes by the operating system 20 when it is according to the ARINC 653 standard. Alternatively, the detection of the completion of the execution of each software processing operation is done via an end of execution trace provided by the avionics software application 14, typically via a dedicated port whose operating system 20 monitors the generation upon expiration of the first predefined execution time T1.

Examples of values of the first and second execution times T1 and T2 are indicated below in the example of a processor where different avionics software applications are installed 14 and for which a real time cycle of 50 ms is defined. During a period of 50 ms, an allocation of 15 ms is made for one of said avionics software applications 14 having defined a worst-case execution time of 8 ms. Under these conditions, the first execution time T1 is for example chosen to be equal to 8 ms and the second execution time T2 is chosen to be equal to 15 ms (or between 8 ms and 15 ms based on the analysis of the security of the corresponding avionics software application 14).

According to the second embodiment of the described technology, the second monitoring module 28 is configured to monitor the behavior of the avionics software application 14, through the verification, upon expiration of a predefined monitoring period Tf, of the detection of at least one application event of the avionics software application.

According to this second embodiment, the update module 27 is then configured to update the status of the avionics software application 14 based on both the monitoring of the execution duration and the monitoring of the behavior of the avionics software application.

Application event refers to an event providing information on the status of the avionics software application 14, the event then being described as application, an event generally being anything observable at a given moment on the platform 16. As an example, an event is for instance the fact that the processes according to standard ARINC 653 of the application are completed before the predefined monitoring time Tf, or the fact that the avionics software application 14 performed a particular monitoring task and gave an adequate response. An application event in the context of monitoring behavior is considered as being natural, for example in case of the provision by the avionics software application 14 of data at known moments, or constrained, for example in case of adding activities making it possible to build proof of good health of the avionics software application 14, typically by placing, during the execution of the avionics software application 14, calculations whose result is known in order to verify the proper execution of the avionics software application 14 at the end of its allotted time.

The determination of the predefined monitoring time Tf for example depends on partitioning analyses and a characterization done on the corresponding processor of the platform 16, the monitoring time Tf being defined as the time beyond which corresponds to a contention, and exceeding this monitoring time Tf then corresponds to an avionics software application 14 that is beyond control.

The duration of the predefined monitoring time Tf is of the same order of magnitude as that of the first and second execution times T1 and T2, typically between the duration of the first execution time T1 and that of the second execution time T2. In the case where the duration of the predefined monitoring time Tf is greater than that of the second monitoring time T2, there will be no distinction between a contention resulting in a "nonsecure" status and a "beyond control" application upon expiration of the second execution time T2. The "nonsecure" status is also called "out of safety" status. The "beyond control" status is also called "out of control" status.

One skilled in the art will observe that the determination of the times T1, T2 and Tf depends on the usage context, the avionics software application and the characterization done on the corresponding processor of the platform 16, the processor preferably being a multicore processor. The way in which these thresholds are determined does not affect the monitoring method according to the described technology, for which these thresholds are input parameters.

As an example of determination of the times T1, T2 and Tf, each installed avionics software application 14, which has been subject to a separate qualification, is associated with one or several WCET values corresponding to functional chains for which guarantees must be provided in the context of the certification.

The characterization of the multicore processor done from analyses and measurements under worst-case theoretical conditions then makes it possible to obtain:

a guaranteed ratio between an execution duration in a context where a single core is used and an execution duration in a context where all of the cores of the processor are used in their usage domain;

an additional margin, in order to guarantee a safer operation of the avionics software application 14 (for example to be applied over the worst-case times to guarantee, at least for the most critical applications, the absorption of contentions that may have escaped the characterization approach); and a maximum margin beyond which it will be considered that an execution duration no longer results from a contention, but an error or crash of the avionics software application 14.

For each functional chain monitored by the device and the monitoring method according to the described technology, the times T1, T2 and Tf are then for example predefined according to the following formulas, with a temporal origin corresponding to the beginning of execution of the avionics software application 14 in an allocated time slot:

$$T1 = WCET \times \text{guaranteed ratio} \quad (1)$$

$$T2 = T1 \times \text{additional margin} \quad (2)$$

$$Tf = T1 \times \text{maximum margin} \quad (3)$$

One skilled in the art will further note that the characterization of the processor may result in several sets of parameters corresponding to different uses of the processor (for example, "computing" use, "input-output" use, etc.), and the times T1, T2 and Tf are then predefined based on these varied uses.

Figure 2:
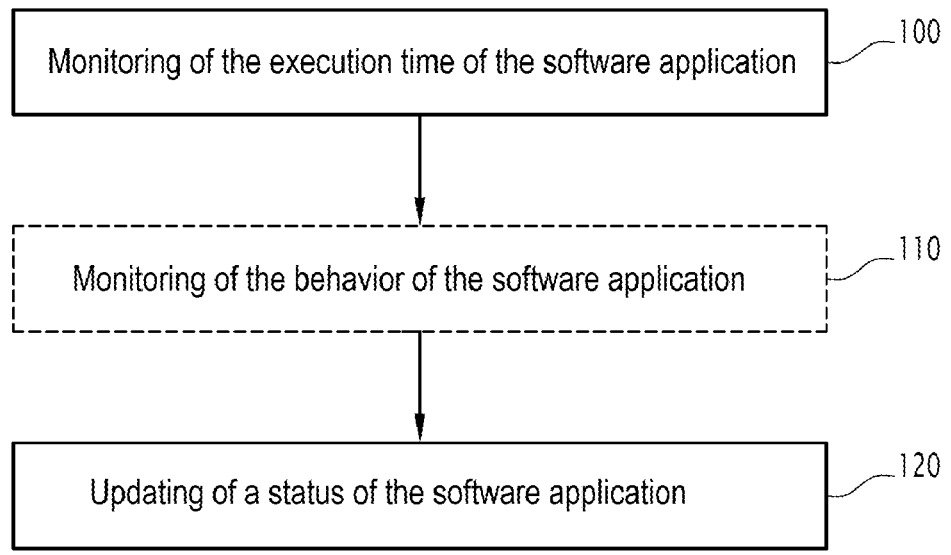
FIG. 2 is a flowchart of a method, according to the described technology, for monitoring an avionics software application able to be executed on the platform, the method being carried out by the monitoring device of FIG. 1.

The operation of the monitoring device 24 according to the described technology will now be explained using FIG. 2, showing a flowchart of the method, according to the described technology, for monitoring an avionics software application 14 able to be executed on the platform 16, the method being carried out by the electronic monitoring device 24.

During a step 100, the monitoring device 24 monitors, via its first monitoring module 26, of the corresponding execution duration of the avionics software application 14. This monitoring application 100 comprises the verification, upon expiration of at least one predefined execution time T1, T2, of the completion of the execution of at least one software processing operation of the avionics software application 14.

Figure 3:
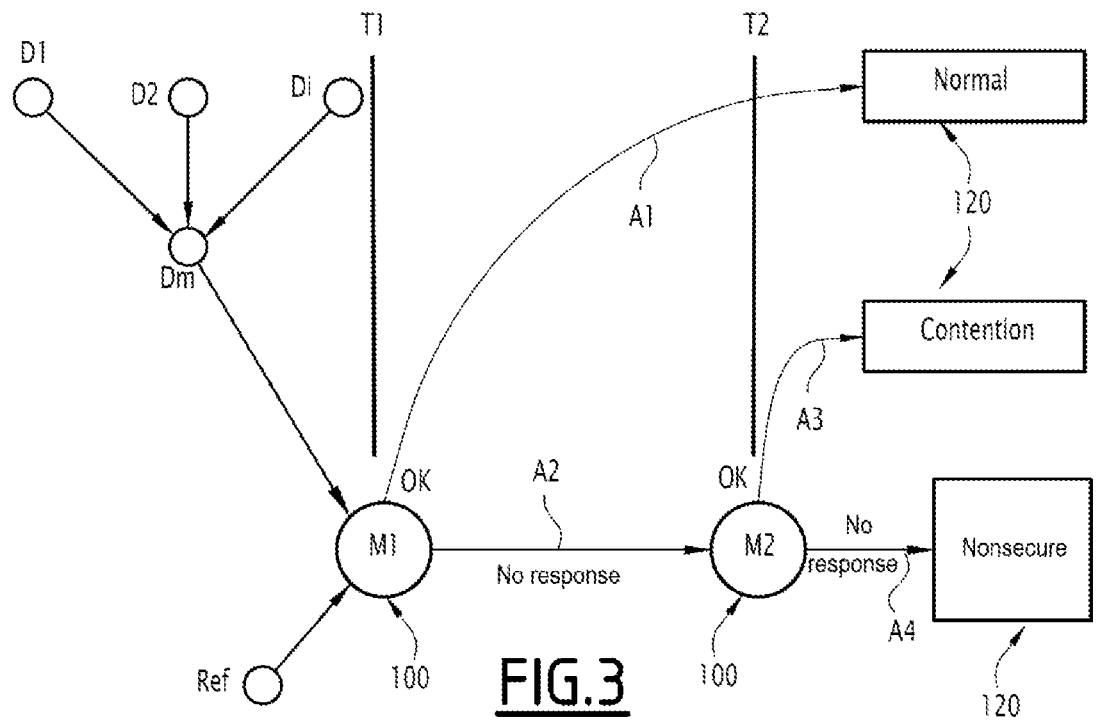
FIG. 3 is a flow chart of the monitoring method according to a first embodiment of the described technology.

This monitoring step 100 comprises a first verification M1, upon expiration of the first predefined execution time T1, of the completion of the execution of at least one software processing operation of the avionics software application 14, as shown in FIG. 3.

When the execution of at least one software processing operation of the avionics software application 14 is not completed upon expiration of the first predefined execution time T1, the monitoring step 100 preferably further comprises a second verification M2, upon expiration of the second predefined execution time T2, of the completion of the execution of at least one software processing operation of the avionics software application 14.

The first verification M1 seeks to diagnose an exceeding of the first predefined execution time T1, for one or several corresponding software processing operations or for the avionics software application 14 as a whole, this excess not implying a security problem.

The aim of the first verification M1 is to monitor the execution time of an avionics software application 14 relative to a normal time, established in compliance with rules of the platform, i.e., relative to a usage domain of the avionics software application 14. The first verification M1 is done upon expiration of the first predefined execution time T1, on which date the execution of the avionics software application 14, or of the monitored associated software processing operation(s), is normally completed, such that exceeding this execution duration can be interpreted as a contention, if the application is not beyond control. The first predefined execution time T1 accounts for the effects on the execution time identified by way of multicore contentions, generally presented in a user guide of the platform 16 and qualified with the platform 16.

If, for a software processing operation or for the avionics software application 14 as a whole, the first predefined execution time T1 is exceeded, the monitoring device 24 then considers that the avionics software application 14 has experienced a greater than normal contention, but that it is capable of operating in a healthy manner until the second predefined execution time T2.

If the first predefined execution time T1 is exceeded for a software processing operation or for the avionics software application 14 as a whole, the monitoring device 24 preferably further counts the event through a first dedicated counter nbM1, to generate a predefined additional action if the number of these excesses exceeds a predefined threshold, for example expressed in number of contentions observed in a predefined time interval. The predefined additional action is typically the load shedding of the platform 16 by stopping an avionics software application 14 from among the least critical avionics software applications 14.

The second verification M2 seeks to diagnose an exceeding of the second predefined execution time T2, for one or several corresponding software processing operations or for the avionics software application 14 as a whole, this excess indicating a security risk. As previously indicated, the second predefined execution time T2 is strictly greater than the first predefined execution time T1.

The purpose of the second verification M2 is to force a decision on a date where the monitoring device 24 can no longer wait for the end of execution of the avionics software application 14 and/or its corresponding software processing operations, either because the duration allocated to the avionics software application 14 is expired, or because beyond this second predefined execution time T2, the avionics software application 14 enters a domain where security is no longer guaranteed. The second predefined execution time T2 is less than or equal to the duration allocated to the avionics software application 14 for its overall execution.

One skilled in the art will further note that each first verification M1 is not necessarily associated with a respective second verification M2, a same second verification M2 for example being associated with several first verifications M1. It is in fact possible to monitor several software processing operations of an avionics software application 14, therefore to have several respective first verifications M1, while performing a single second verification M2 for the avionics software application 14 as a whole. Alternatively, when the avionics software application 14 is broken down into several software processing operations, several groups of first and second verifications M1, M2 can be defined.

If the second predefined execution time T2 is exceeded for a software processing operation or for the avionics software application 14 as a whole, the monitoring device 24 restarts the avionics software application 14. In this case, the monitoring device 24 preferably further accounts for the event via a dedicated second counter nbM2.

Figure 4:
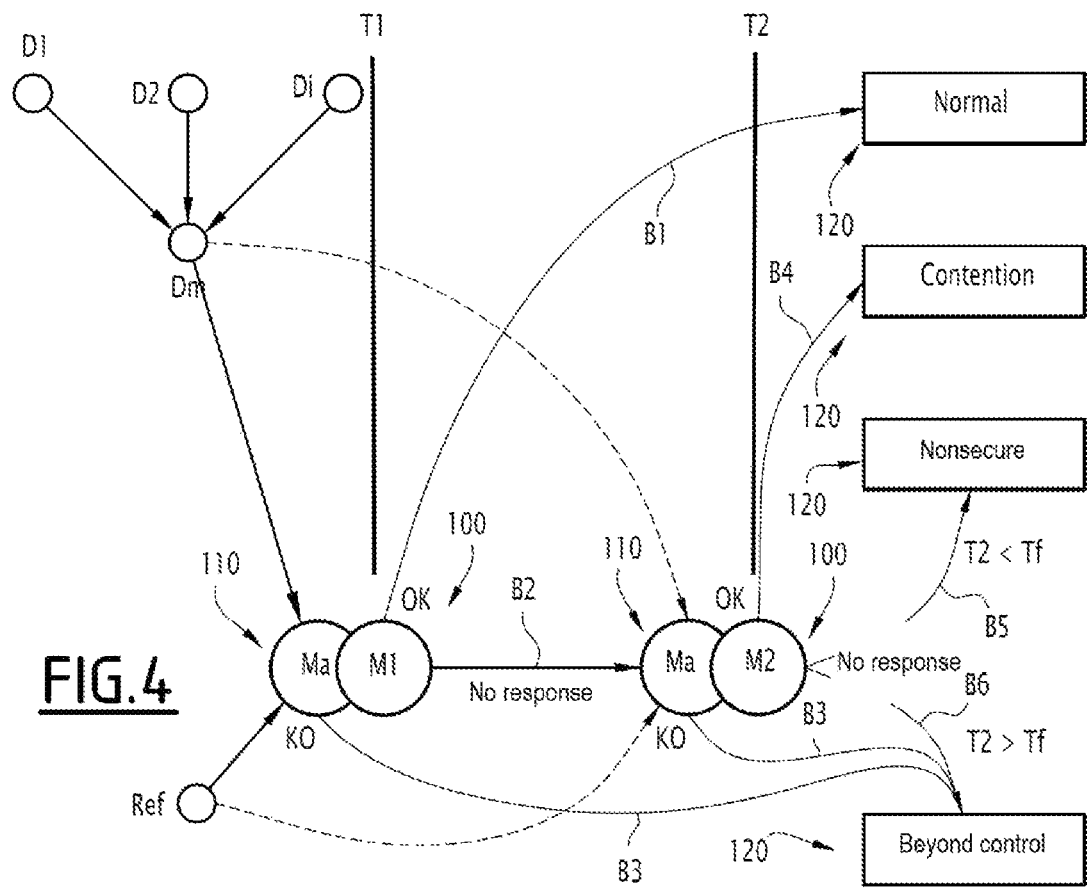
FIG. 4 is a view similar to that of FIG. 3 according to a second embodiment of the described technology.

According to the second embodiment of the described technology, the monitoring device 24 further monitors, during step 110, via its second monitoring module 28, the behavior of the avionics software application 14. This second monitoring step 110 comprises the verification Ma, upon expiration of the predefined monitoring time Tf, of the detection of at least one application event of the avionics software application 14, as shown in FIG. 4.

The verification Ma seeks to diagnose a "beyond control" operation of the avionics software application 14, i.e., unhealthy.

According to the second embodiment of the described technology, the aim is to prevent a "beyond control" avionics software application 14 from triggering aforementioned monitoring actions as contentions and incorrectly. Indeed, an untimely triggering of the monitoring device 24 could lead to the loss of avionics software applications 14 due to poor behavior by other avionics software applications 14, which is not acceptable.

The operation of an avionics software application 14 is considered correct by the second monitoring module 28, for example when at least one of the following events is verified:

the processes according to standard ARINC 653 of the application are completed before the predefined monitoring time Tf, the avionics software application 14 has performed a particular monitoring task, significant for its good health, and given an adequate response.

As an example, the avionics software application 14 must perform a series of calculations in time for which the result is known, but does not exist in the variables managed by the avionics software application 14. The statement of the overall result is provided to the second monitoring module 28 in due time, for example in the context of the monitored WCET. These calculations may further vary from one period to another according to a known plan so as to prevent the application from being blocked on a good result, without the avionics software application 14 having recalculated it in each period.

The second monitoring module 28 then considers the avionics software application 14 to be "beyond control" if:

either one or several software processing operations have not been carried out before the predefined monitoring time Tf, or the avionics software application 14 has not provided the proper response during this second monitoring step 110.

When the avionics software application 14 is considered "beyond control" upon expiration of the predefined monitoring time Tf, the monitoring device 24 stops said avionics software application 14 and restarts it independently of any other monitoring.

According to the second embodiment of the described technology, one skilled in the art will understand that the verification Ma is correlated with the first and second verifications M1, M2, as shown in FIG. 4, since the verification Ma cannot be established if the avionics software application 14 has not completed its activity due to a contention, and conversely the first or second verification M1, M2 cannot be established if the avionics software application 14 is beyond control, and then does not respond.

During the following step 120, the monitoring method includes updating the status of the avionics software application 14.

According to the first embodiment, shown in FIG. 3, the update 120 of the status of the avionics software application 14 depends on the monitoring 100 of the execution duration of the avionics software application 14.

During the step for updating the status 120, the status of the avionics software application 14 is, as shown by arrow A1 in FIG. 3, set at "normal" when the completion of the execution of the corresponding software processing operation(s) of the avionics software application 14 has been detected before the expiration of the first predefined execution time T1, i.e., before the expiration of each predefined execution time T1, T2, the second predefined execution time T2 being strictly greater than the first predefined execution time T1.

When the completion of the execution of the corresponding software processing operation(s) of the avionics software application 14 has not been detected before the expiration of the first predefined execution time T1 during the first verification M1, as shown by arrow A2 in FIG. 3, the first monitoring module 26 performs the second verification M2.

During the step for updating the status 120, the status of the avionics software application 14 is then set at "contention" when the completion of the execution of the corresponding software processing operation(s) of the avionics software application 14 has been detected after the expiration of the first predefined execution time T1 and before the expiration of the second predefined execution time T2, as shown by arrow A3 in FIG. 3.

The status of the avionics software application 14 is set at "nonsecure" when the completion of the execution of the corresponding software processing operation(s) of the avionics software application 14 has not been detected after the expiration of the or each predefined execution time T1, T2, as shown by arrow A4 in FIG. 3.

According to the second embodiment, shown in FIG. 4, the update 120 of the status of the avionics software application 14 depends both on the monitoring 100 of the execution duration of the avionics software application 14 and the monitoring 110 of the behavior of the avionics software application 14.

During this step for updating the status 120, the status of the avionics software application 14 is, as shown by arrow B1 in FIG. 4, set at "normal" when the completion of the execution of the corresponding software processing operation(s) of the avionics software application 14 has been detected before the expiration of the first predefined execution time T1, i.e., before the expiration of each predefined execution time T1, T2, and when the correct application event(s) have been detected before the expiration of the predefined monitoring time Tf.

When the completion of the execution of the corresponding software processing operation(s) of the avionics software application 14 has not been detected before the expiration of the first predefined execution time T1 during the first verification M1 and when the avionics software application 14 is not considered to be "beyond control", the first monitoring module 26 performs the second verification M2, as shown by arrow B2 in FIG. 4.

During the step for updating the status 120, the status of the avionics software application 14 is set at "beyond control" when no application event has been detected upon expiration of the predefined monitoring period Tf or when the detected application event is incorrect, as shown by arrow B3 in FIG. 4.

The status of the avionics software application 14 is set at "contention" when the completion of the execution of the corresponding software processing operation(s) of the avionics software application 14 has been detected after the expiration of the first predefined execution time T1 and before the expiration of the second predefined execution time T2, and when the correct application event(s) have been detected before the expiration of the predefined monitoring time Tf, as shown by arrow B4 in FIG. 4.

The status of the avionics software application 14 is set at "nonsecure" when the completion of the execution of the corresponding software processing operation(s) of the avionics software application 14 has not been detected after the expiration of the or each predefined execution time T1, T2, and when the correct application event(s) have been detected before the expiration of the predefined monitoring time Tf, as shown by arrow B5 in FIG. 4.

When the completion of the execution of the corresponding software processing operation(s) of the avionics software application 14 has not been detected after the expiration of the or each predefined execution time T1, T2, and when no application event has been detected upon expiration of the predefined monitoring period Tf or the detected application event is incorrect, the status of the avionics software application 14 is, during the step for updating the status 120, set at "nonsecure" if each predefined execution time T1, T2 is less than or equal to the predefined monitoring time Tf, in particular if the second predefined execution time T2 is less than or equal to the predefined monitoring time Tf, as shown by arrow B5 in FIG. 4.

Otherwise, i.e., if each predefined execution time T1, T2 is greater than the predefined monitoring time Tf, in particular if the second predefined execution time T2 is greater than the predefined monitoring time Tf, and the completion of the execution of the corresponding software processing operation(s) of the avionics software application 14 has not been detected after the expiration of the or each predefined execution time T1, T2, no application event further having been detected upon expiration of the predefined monitoring period Tf or the detected application event being incorrect, the status of the avionics software application 14 is then set at "beyond control", as shown by arrow B6 in FIG. 4.

The method and the monitoring device 24 according to the described technology then make it possible to determine the status of the avionics software application 14 more precisely, based on the monitoring of the execution duration of the avionics software application 14, or even according to the second embodiment further based on the monitoring of the behavior of the avionics software application 14.

One can thus see that the method and the monitoring device 24 according to the described technology make it possible to monitor the software application 14 more effectively.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A method of monitoring an avionics software application, executed on a platform hosting an operating system, the avionics software application comprising one or several software processing operations to be executed, the platform configured to be on board an aircraft, the method being implemented by an electronic monitoring device and comprising:

monitoring the execution duration of the avionics software application, through verification, upon expiration of a first predefined execution time, then upon expiration of a second predefined execution time, of the completion of the execution of at least one software processing operation of the avionics software application, the second predefined execution time being strictly greater than the first predefined execution time; and updating a status of the avionics software application based on the monitoring of the execution duration of the avionics software application.

2. The method according to claim 1, wherein, during the updating the status, the status of the avionics software application is set to be indicative of contention when the completion of the execution of the corresponding software processing operation(s) of the avionics software application has been detected after the expiration of the first predefined execution time and before the expiration of the second predefined execution time.

3. The method according to claim 1, wherein, during the updating the status:

the status of the avionics software application is set to be indicative of normal when the completion of the execution of the corresponding software processing operation(s) of the avionics software application has been detected before the expiration of the or each predefined execution time; and the status of the avionics software application is set to be indicative of nonsecure when the completion of the execution of the corresponding software processing operation(s) of the avionics software application has not been detected after the expiration of the or each predefined execution time.

4. The method according to claim 1, wherein the method further comprises:

monitoring the behavior of the avionics software application, through the verification, upon expiration of a predefined monitoring period, of the detection of at least one application event of the avionics software application, wherein the updating of the status of the avionics software application depends on the monitoring of the execution duration and the monitoring of the behavior of the avionics software application.

5. The method according to claim 4, wherein the monitoring the execution duration comprises verifying, upon expiration of a first predefined execution time, then upon expiration of a second predefined execution time, the completion of the execution of at least one software processing operation of the avionics software application, the second predefined execution time being strictly greater than the first predefined execution time; and wherein, during the step for updating the status, the status of the avionics software application is set to be indicative of contention when the completion of the execution of the corresponding software processing operation(s) of the avionics software application has been detected after the expiration of the first predefined execution time and before the expiration of the second predefined execution time, and when the correct application event (s) have been detected before the expiration of the predefined monitoring period.

6. The method according to claim 4, wherein, during the updating the status:

the status of the avionics software application is set to be indicative of normal when the completion of the execution of the corresponding software processing operation(s) of the avionics software application has been detected before the expiration of the or each predefined execution time and when the correct application event (s) have been detected before the expiration of the predefined monitoring period; and the status of the avionics software application is set to be indicative of nonsecure when the completion of the execution of the corresponding software processing operation(s) of the avionics software application has not been detected after the expiration of the or each predefined execution time and when the correct application event(s) have been detected before the expiration of the predefined monitoring period.

7. The method according to claim 5, wherein, during the updating the status:

the status of the avionics software application is set to be indicative of normal when the completion of the execution of the corresponding software processing operation(s) of the avionics software application has been detected before the expiration of the or each predefined execution time and when the correct application event (s) have been detected before the expiration of the predefined monitoring period; and the status of the avionics software application is set to be indicative of nonsecure when the completion of the execution of the corresponding software processing operation(s) of the avionics software application has not been detected after the expiration of the or each predefined execution time and when the correct application event(s) have been detected before the expiration of the predefined monitoring period.

8. The method according to claim 4, wherein, during the updating the status, the status of the avionics software application is set to be indicative of beyond control when no application event has been detected upon expiration of the predefined monitoring period or when the detected application event is incorrect.

9. The method according to claim 4, wherein when the completion of the execution of the corresponding software processing operation(s) of the avionics software application has not been detected after the expiration of the or each predefined execution time, and when no application event has been detected upon expiration of the predefined monitoring period or the detected application event is incorrect, the status of the avionics software application is, during the step for updating the status, set to be indicative of nonsecure if each predefined execution time is shorter than the predefined monitoring period and beyond control if not.

10. A non-transitory computer-readable medium including a computer program comprising software instructions which, when executed by a computer, carry out a method according to claim 1.

11. An electronic monitoring device for monitoring an avionics software application, executed on a platform hosting an operating system, the avionics software application comprising one or several software processing operations to be executed, the platform being configured to be on board an aircraft, the electronic monitoring device comprising:

a monitoring module configured to monitor the execution duration of the avionics software application, through the verification, upon expiration of a first predefined execution time, then upon expiration of a second predefined execution time, of the completion of the execution of at least one software processing operation of the avionics software application, the second predefined execution time being strictly greater than the first predefined execution time; and an update module configured to update a status of the avionics software application based on the monitoring of the execution duration of the avionics software application.

12. An electronic avionics system, comprising:

a memory configured to store at least one avionics software application;

a platform configured to execute each avionics software application, the platform hosting an operating system; and an electronic monitoring device for each avionics software application, the electronic monitoring device being according to claim 11.

* * * * *